(12) United States Patent
Jessup

(10) Patent No.: US 11,673,530 B2
(45) Date of Patent: Jun. 13, 2023

(54) DUAL-WEB RETRACTOR ARRANGEMENT

(71) Applicant: Indiana Mills & Manufacturing, Inc., Westfield, IN (US)

(72) Inventor: Chris P. Jessup, Sheridan, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 0 days.

(21) Appl. No.: 17/825,271

(22) Filed: May 26, 2022

(65) Prior Publication Data
US 2022/0281407 A1    Sep. 8, 2022

Related U.S. Application Data

(62) Division of application No. 16/883,175, filed on May 26, 2020, now Pat. No. 11,370,388.

(60) Provisional application No. 62/855,048, filed on May 31, 2019.

(51) Int. Cl.
*B60R 22/36* (2006.01)
*B65H 75/44* (2006.01)
*B60R 22/34* (2006.01)

(52) U.S. Cl.
CPC ......... *B60R 22/36* (2013.01); *B65H 75/4418* (2013.01); *B65H 75/4471* (2013.01); *B60R 2022/3402* (2013.01); *B60R 2022/3424* (2013.01)

(58) Field of Classification Search
CPC . B60R 22/34; B60R 22/36; B60R 2022/3402; B60R 2022/3424; B65H 75/4418; B65H 75/4471
See application file for complete search history.

(56) References Cited

U.S. PATENT DOCUMENTS

| | | | |
|---|---|---|---|
| 4,427,163 A | 1/1984 | Kondziola | |
| 6,609,275 B1 | 8/2003 | Lin | |
| 7,350,767 B2 | 4/2008 | Huang | |
| 7,874,047 B2 | 1/2011 | Breeden | |
| 8,444,222 B2 | 5/2013 | Buckingham et al. | |
| 8,615,109 B2 | 12/2013 | Shimizu | |
| 11,370,388 B2 * | 6/2022 | Jessup | ................ B65H 75/4418 |

* cited by examiner

*Primary Examiner* — Sang K Kim
(74) *Attorney, Agent, or Firm* — Barnes & Thornburg LLP

(57) ABSTRACT

A dual-web retractor includes a frame having first, second and third sidewalls spaced apart from one another with the second sidewall positioned between the first and third sidewalls, a spool rotatably mounted to and between the first, second and third sidewalls, the spool having a first spool section defined between the first and second sidewalls and a second spool section defined between the second and third sidewalls, a first web having one end coupled to the first spool section, and a second web having one end coupled to the second spool section, wherein rotation of the spool causes the first and second webs to be simultaneously paid taken up on or paid out from the first and second respective spool sections.

20 Claims, 13 Drawing Sheets

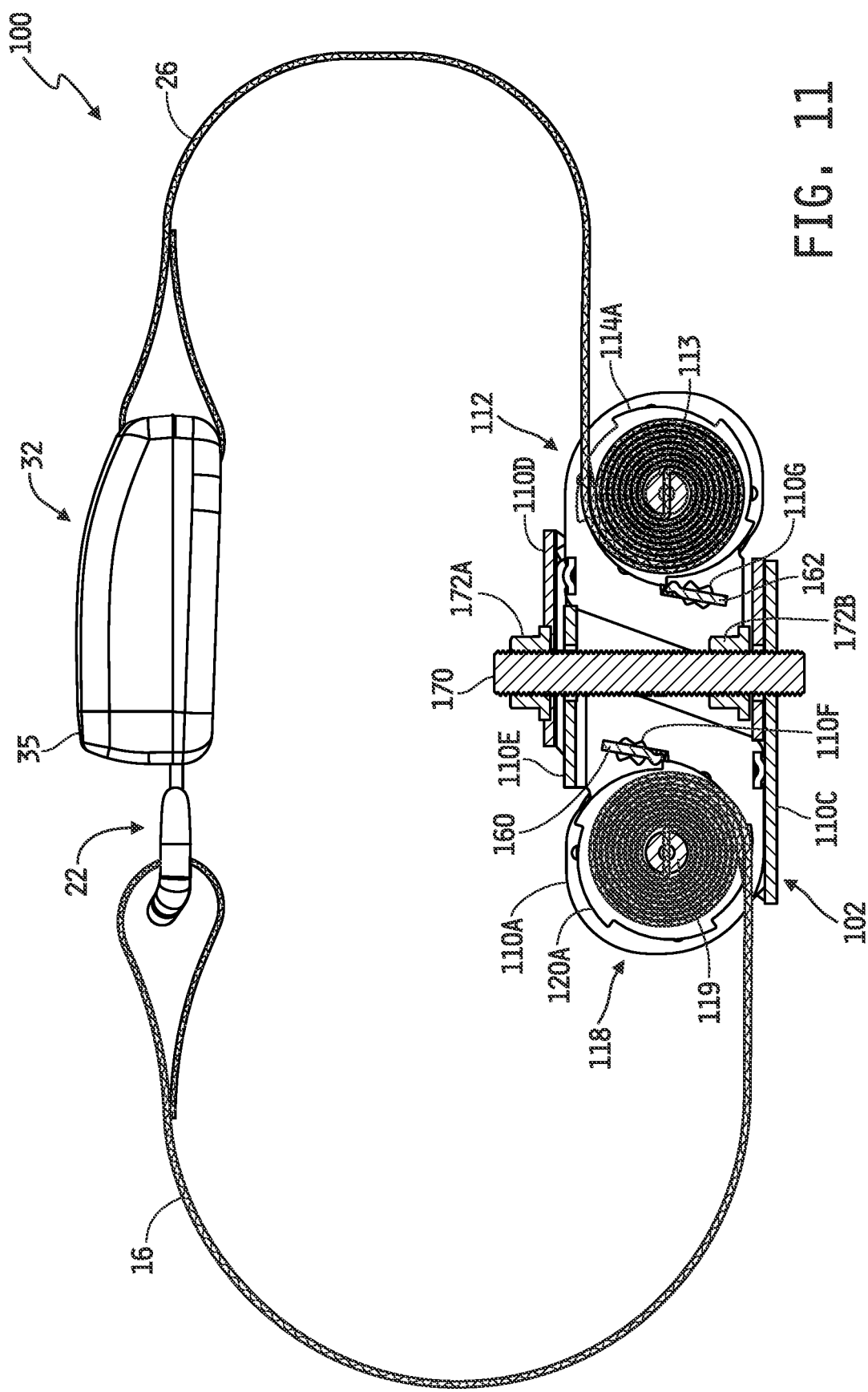

DUAL-WEB RETRACTOR ARRANGEMENT

CROSS-REFERENCE TO RELATED APPLICATION

This is a division of U.S. patent application Ser. No. 16/883,175, filed May 26, 2020, which claims the benefit of, and priority to, U.S. Provisional Patent Application Ser. No. 62/855,048, filed May 31, 2019, the disclosures of which are expressly incorporated herein by reference in their entireties.

FIELD OF THE DISCLOSURE

The present disclosure relates generally to restraint systems for motor vehicles, and more specifically to web-based restraint systems including one or more retractors.

BACKGROUND

Conventional motor vehicles may be equipped with one or more web-based restraint devices configured to secure passengers and/or cargo in a motor vehicle. Such restraint devices typically include one or more retractors.

SUMMARY

The present disclosure may comprise one or more of the features recited in the attached claims, and/or one or more of the following features and combinations thereof. In a first aspect, dual-web retractor may comprise a frame having spaced-apart sidewalls, a spool rotatably mounted to and between the sidewalls, a pair of engagement members configured to be releasably engaged to one another, and a single web having opposite ends each coupled to a different one of the pair of engagement members and a portion of the single web between the opposite ends affixed to the spool to define a first web section extending from one end of the frame between the spool and one of the pair of engagement members and a second web section extending from an opposite end of the frame between the spool and the other of the pair of engagement members, the first and second web sections responsive to rotation of the spool in a web take up direction to alternatingly wrap together onto the spool and to rotation of the spool in a web pay out direction to alternatingly unwrap together from the spool.

In another aspect, a dual-web retractor may comprise a frame having spaced-apart sidewalls, a first spool rotatably mounted to and between the sidewalls, a second spool rotatably mounted to and between the sidewalls, the first and second spools spaced apart from one another with a rotational axis of the first spool parallel with a rotational axis of the second spool, a pair of engagement members configured to be releasably engaged to one another, a first web having one end coupled to one of the pair of engagement members and an opposite end affixed to the first spool such that the first web extends from one end of the frame between the first spool and the one of the pair of engagement members, a second web having one end coupled to the other of the pair of engagement members and an opposite end affixed to the second spool such that the second web extends from an opposite end of the frame between the second spool and the other of the pair of engagement members, and means for synchronizing rotation of the first and second spools such that rotation of one of the first and second spools in a web take up direction causes rotation of the other of the first and second spools in the web take up direction so that the first and second webs are simultaneously taken up on the first and second spools respectively, and such that rotation of one of the first and second spools in a web payout direction causes rotation of the other of the first and second spools in the web payout direction so that the first and second webs are simultaneously paid out from the first and second spools respectively.

In yet another aspect, a dual-web retractor may comprise a frame having first, second and third sidewalls spaced apart from one another with the second sidewall positioned between the first and third sidewalls, a spool rotatably mounted to and between the first, second and third sidewalls, the spool having a first spool section defined between the first and second sidewalls and a second spool section defined between the second and third sidewalls, a pair of engagement members configured to be releasably engaged to one another, a first web having one end coupled to one of the pair of engagement members and an opposite end affixed to the first spool section such that the first web extends from one end of the frame between the first spool section and the one of the pair of engagement members, and a second web having one end coupled to the other of the pair of engagement members and an opposite end affixed to the second spool section such that the second web extends from an opposite end of the frame between the second spool section and the other of the pair of engagement members, wherein rotation of one of the first and second spool sections in a web take up direction causes rotation of the other of the first and second spool sections in the web take up direction so that the first and second webs are simultaneously taken up on the first and second spool sections respectively, and such that rotation of one of the first and second spool sections in a web payout direction causes rotation of the other of the first and second spool sections in the web payout direction so that the first and second webs are simultaneously paid out from the first and second spool sections respectively.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

FIG. 11 is a cross-sectional view of the dual-web retractor arrangement of FIG. 9 as viewed along section lines 11-11.

DETAILED DESCRIPTION OF THE DRAWINGS

Figure 1:
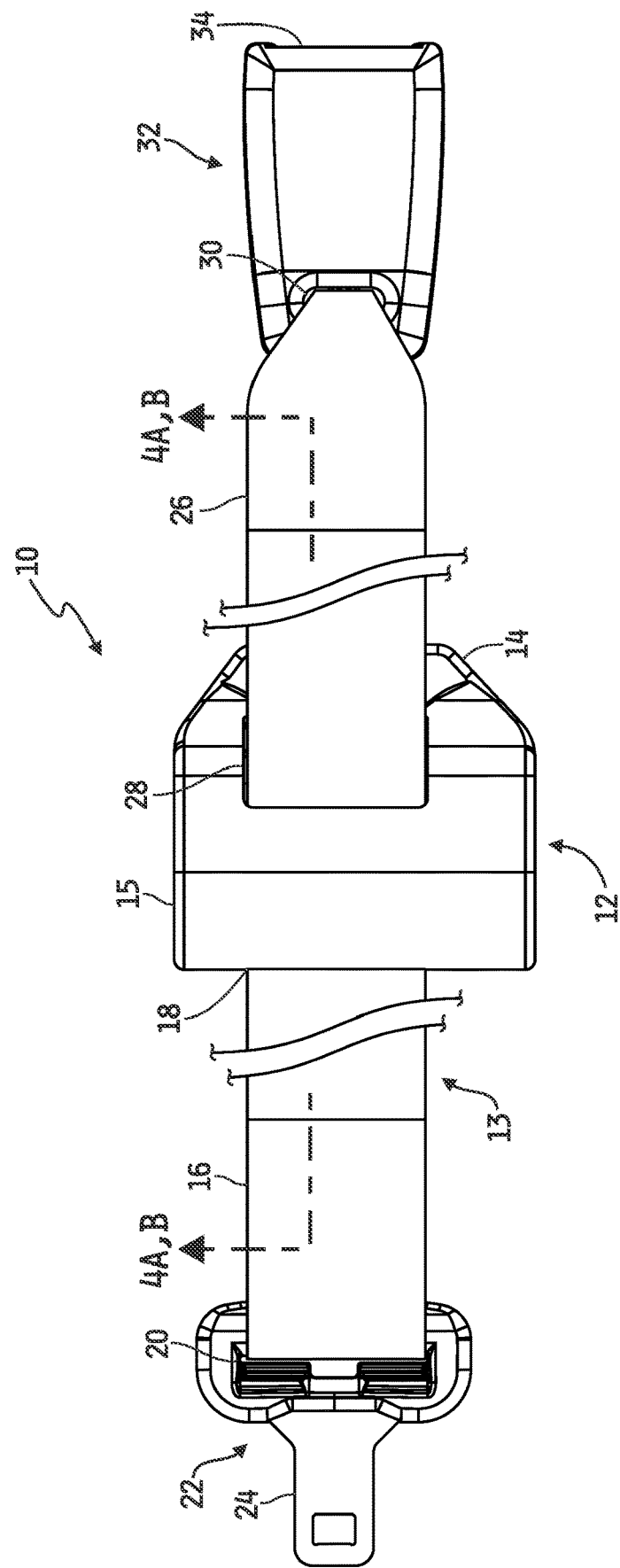
FIG. 1 is a top plan view of an embodiment of a dual-web retractor arrangement.
Figure 2:
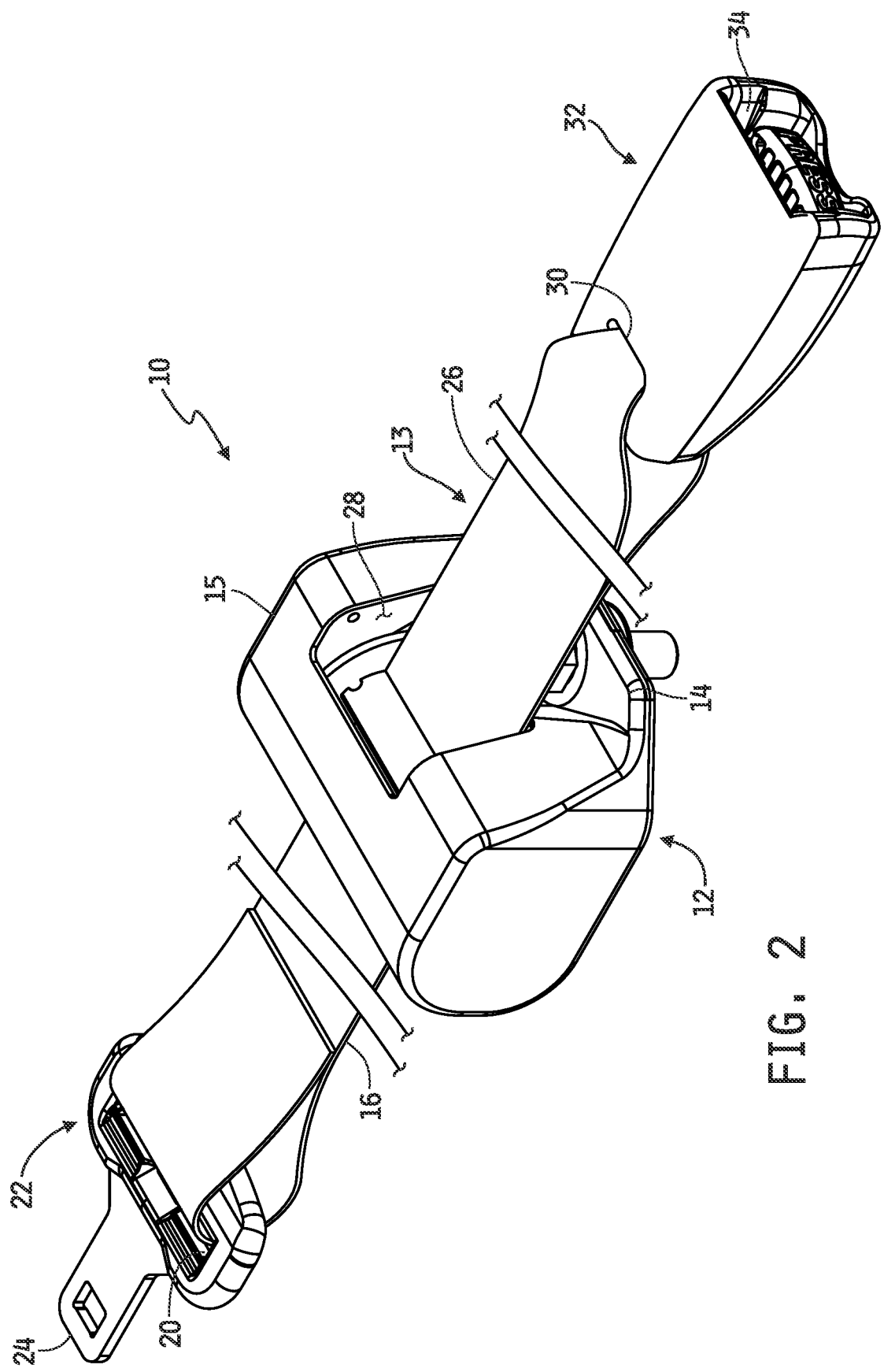
FIG. 2 is a perspective view of the dual-web retractor arrangement of FIG.
Figure 3:
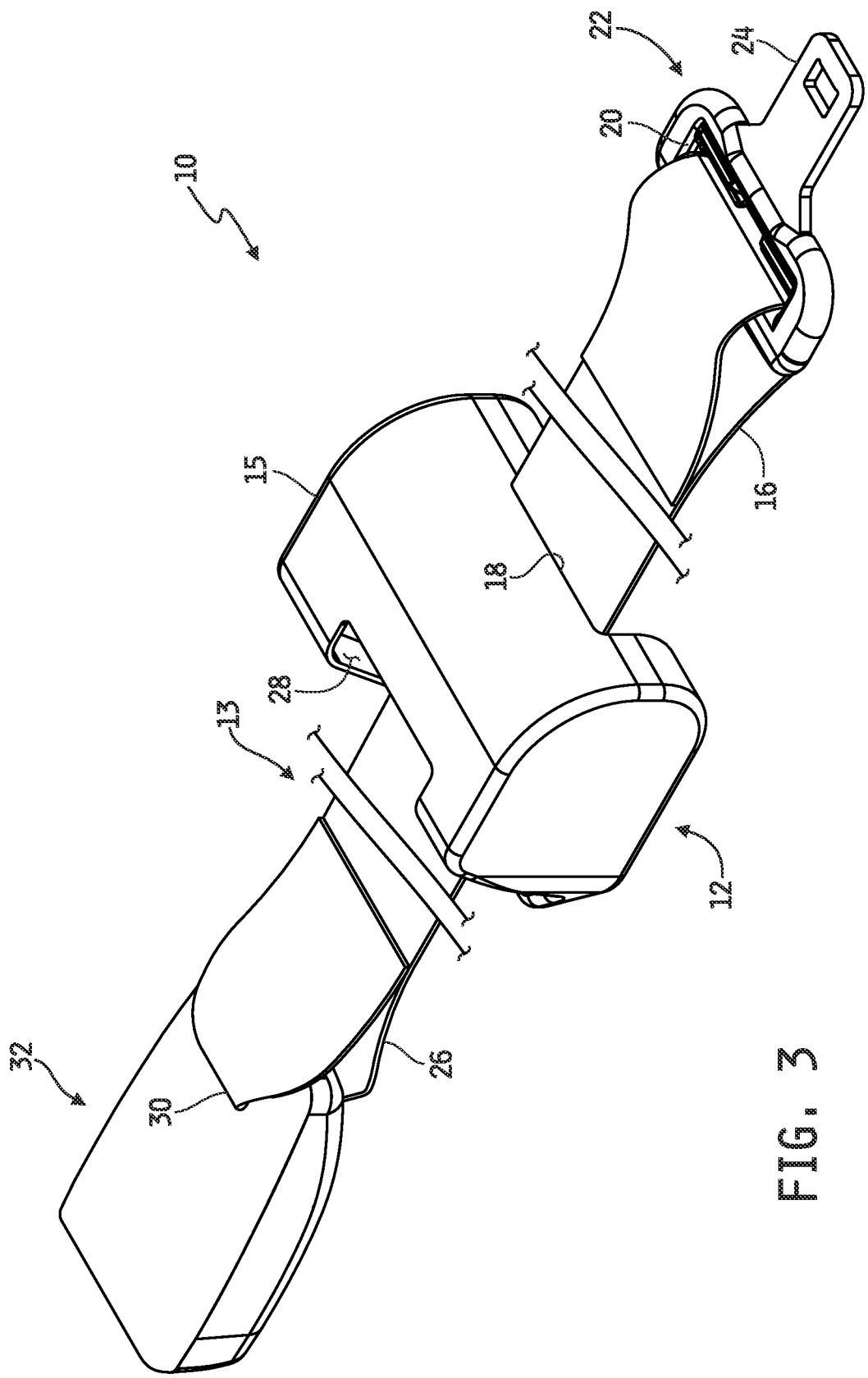
FIG. 3 is another perspective view of the dual-web retractor arrangement of FIG. 1.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to various embodiments of a dual-web retractor arrangement in which two sections of a single web, or in which two separate webs, are simultaneously retractable within the retractor arrangement, i.e., the webs or web sections can be simultaneously wound onto or otherwise taken up on at least one retractor spool, and are simultaneously payable out of the retractor arrangement, i.e., the webs or web sections can be simultaneously unwound from or otherwise released from the at least one retractor spool. Referring now to FIGS. 1-4B, an embodiment 10 of a dual-web retractor arrangement is shown. In the illustrated embodiment, the retractor arrangement 10 includes a dual-web retractor 12 within which a single web 13 is operatively attached to a frame 14 to which a housing 15 is mounted, wherein the single web 13 has two opposed sections 16, 26 each extending away from an attachment point of the single web 13 within the web retractor 12. One end of the housing 15 illustratively defines a web opening 18 through which the web section 16 passes into and out of the housing 15, and an opposite end of the housing 15 defines another web opening 28 through which the web section 26 passes into and out of the housing 15.

In the illustrated embodiment, one end of the single web 13 defined at the end of the web section 16 passes through a slot 20 defined on a conventional engagement member 22, and is then attached back onto the web section 16 in a conventional manner to secure the web section 16 to the engagement member 22. In the illustrated embodiment, the engagement member 22 is a conventional tongue member of a conventional restraint system, and in this embodiment the tongue member 22 illustratively defines a conventional tongue 24 configured to be detachably coupled to a conventional buckle member. In this regard, an opposite end of the single web 13 defined at the end of the web section 26 passes through a slot 30 defined on another conventional engagement member 32 in the form of a conventional buckle member. The end of the web section 26 is then attached back onto the web section 26 in a conventional manner to secure the web section 26 to the buckle member 32. The buckle member 32 illustratively defines a conventional slot 34 therein sized and configured to receive the tongue member 22. The buckle member 32 includes a conventional locking structure therein configured to lockingly engage the tongue member 22, and further includes a release actuator 35 operatively coupled to the locking structure. The tongue member 22 and the buckle member 32 are configured and operable in a conventional manner such that advancing the tongue 24 into the slot 34 causes the locking structure to engage the tongue 24 and lock or lockingly couple the tongue member 22 to the buckle member 32, and the locking structure is responsive to actuation of the release actuator 35 to release the tongue 24 therefrom and, in some embodiments, to at least partially eject the tongue 24 from the slot 34.

Figure 4A:
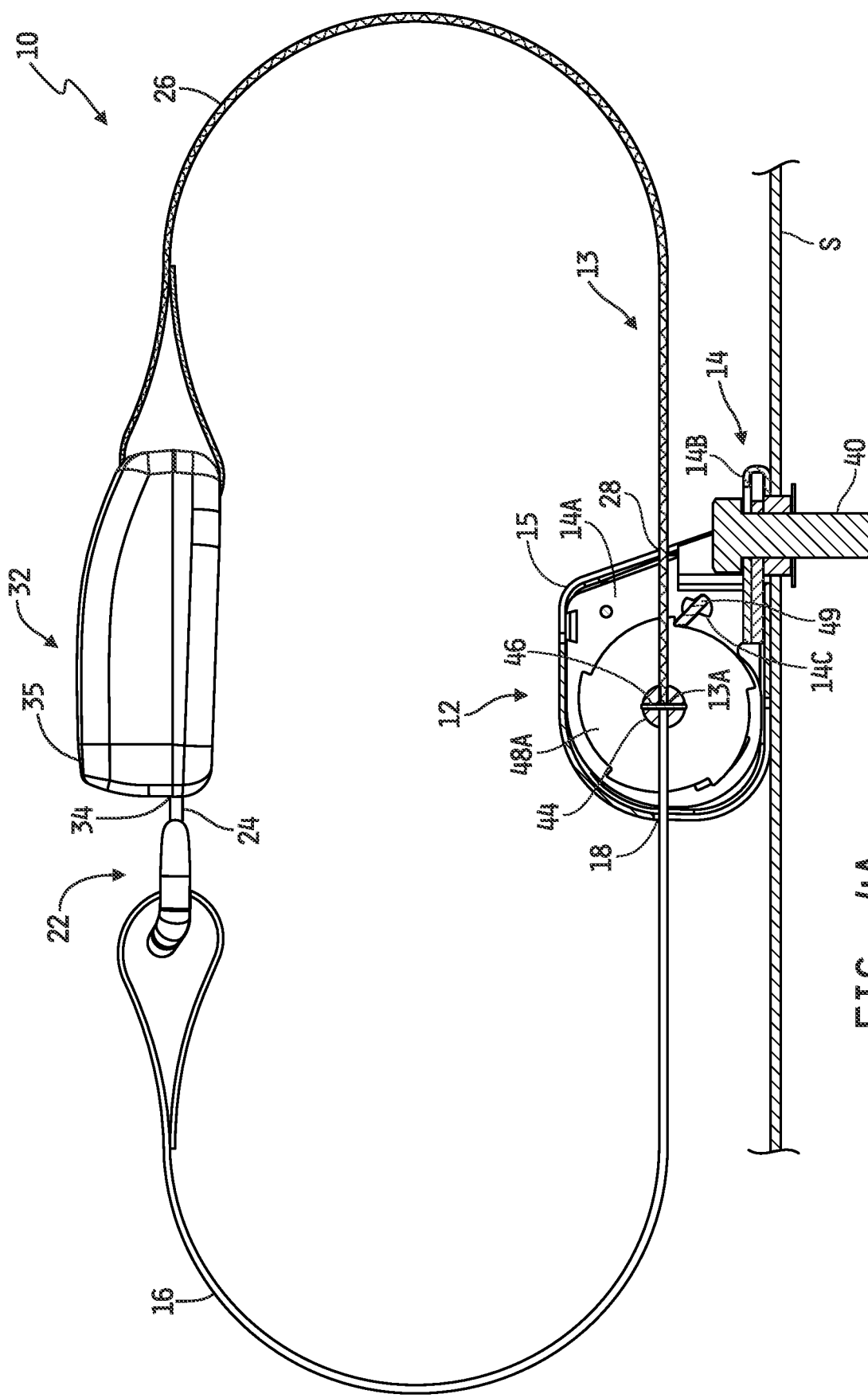
FIG. 4A is a cross-sectional view of the dual-web retractor arrangement of FIG. 1 as viewed along section lines 4A,B-4A,B and illustrating the retractor arrangement with the single web at least partially retracted within the retractor and wrapped about the retractor spool.
Figure 4B:
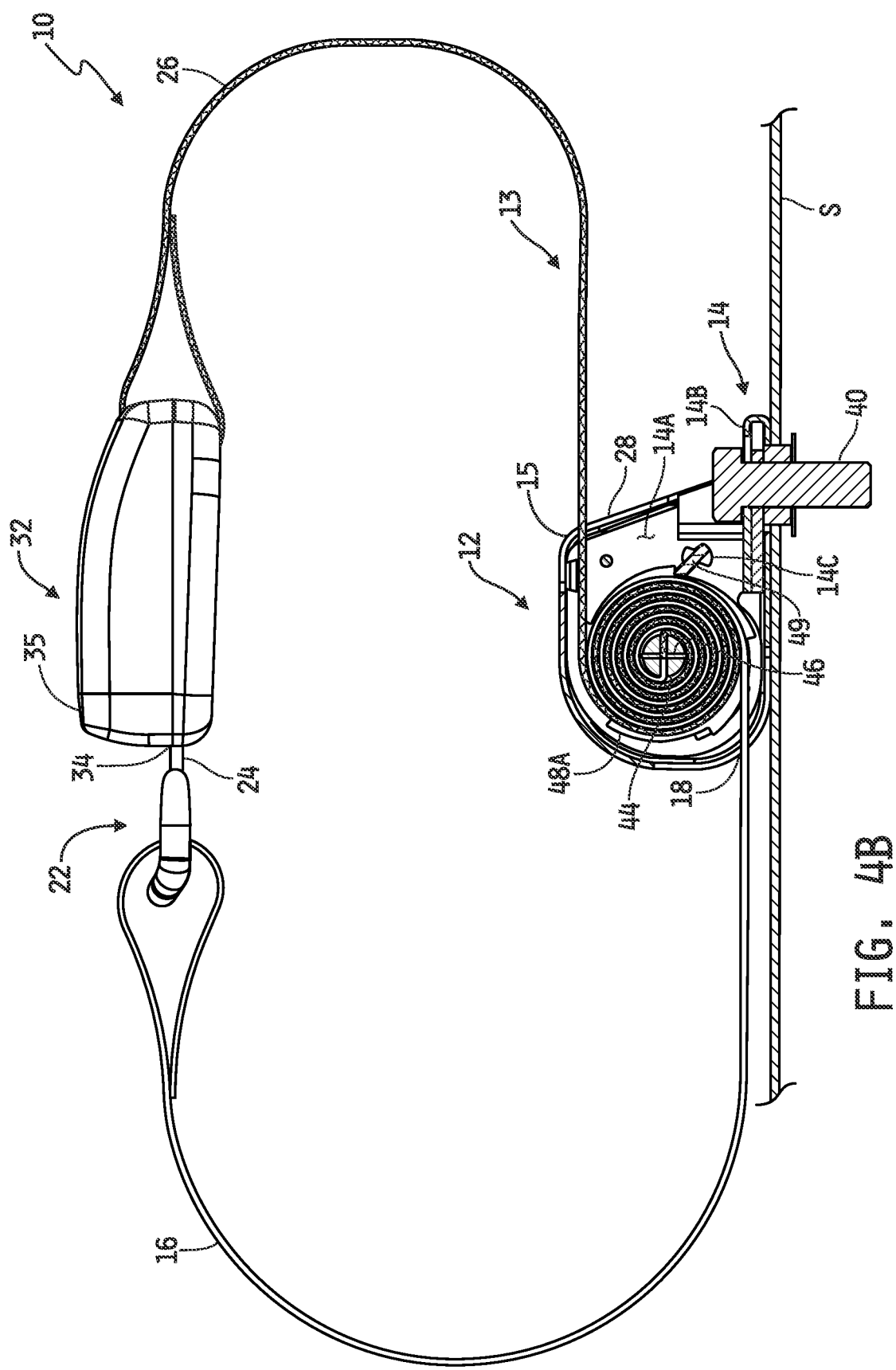
FIG. 4B is another cross-sectional view of the dual-web retractor arrangement of FIG. 1 as viewed along section lines 4A,B-4A,B and illustrating the retractor arrangement with the single web fully paid out of the retractor.
Figure 5:
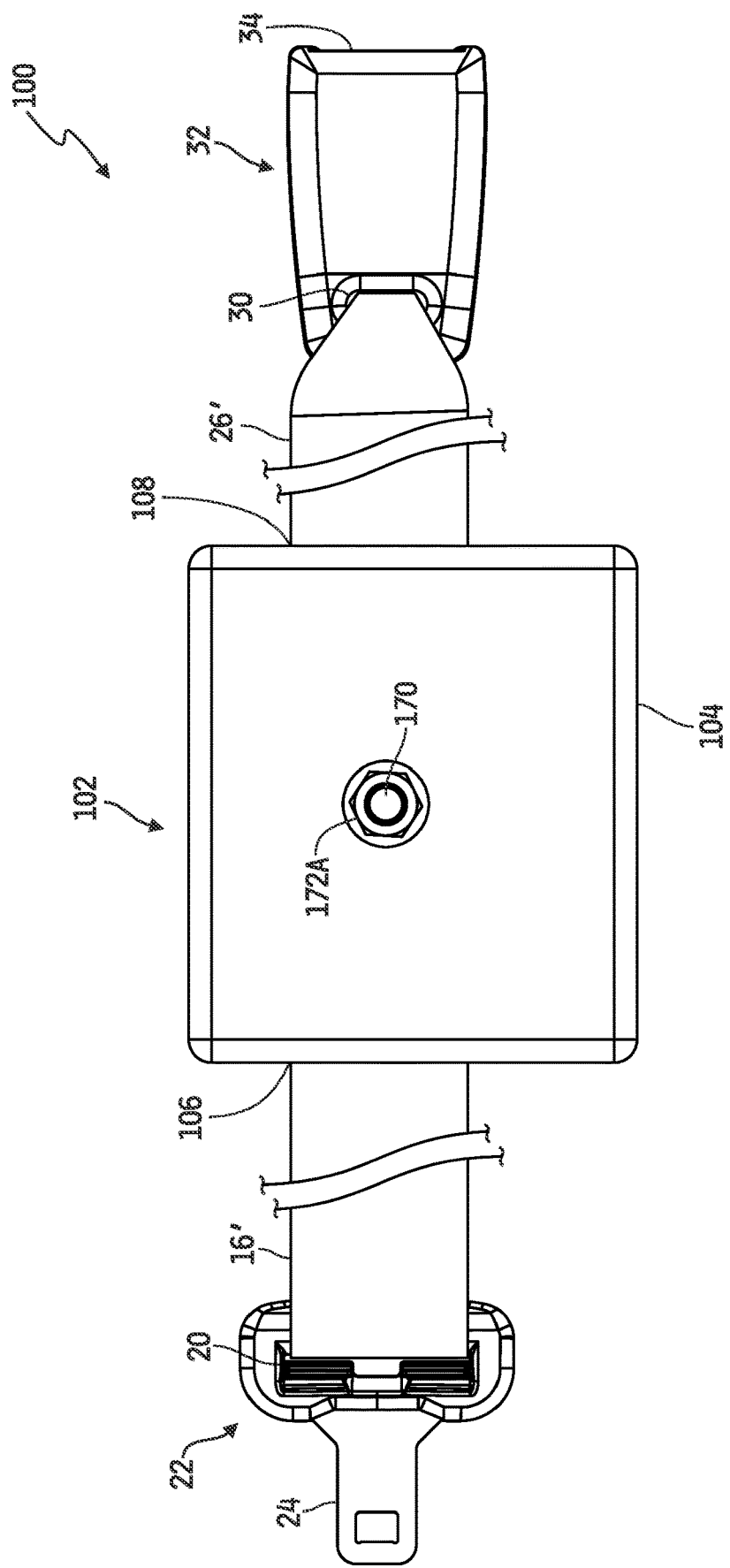
FIG. 5 is a top plan view of another embodiment of a dual-web retractor arrangement.
Figure 6:
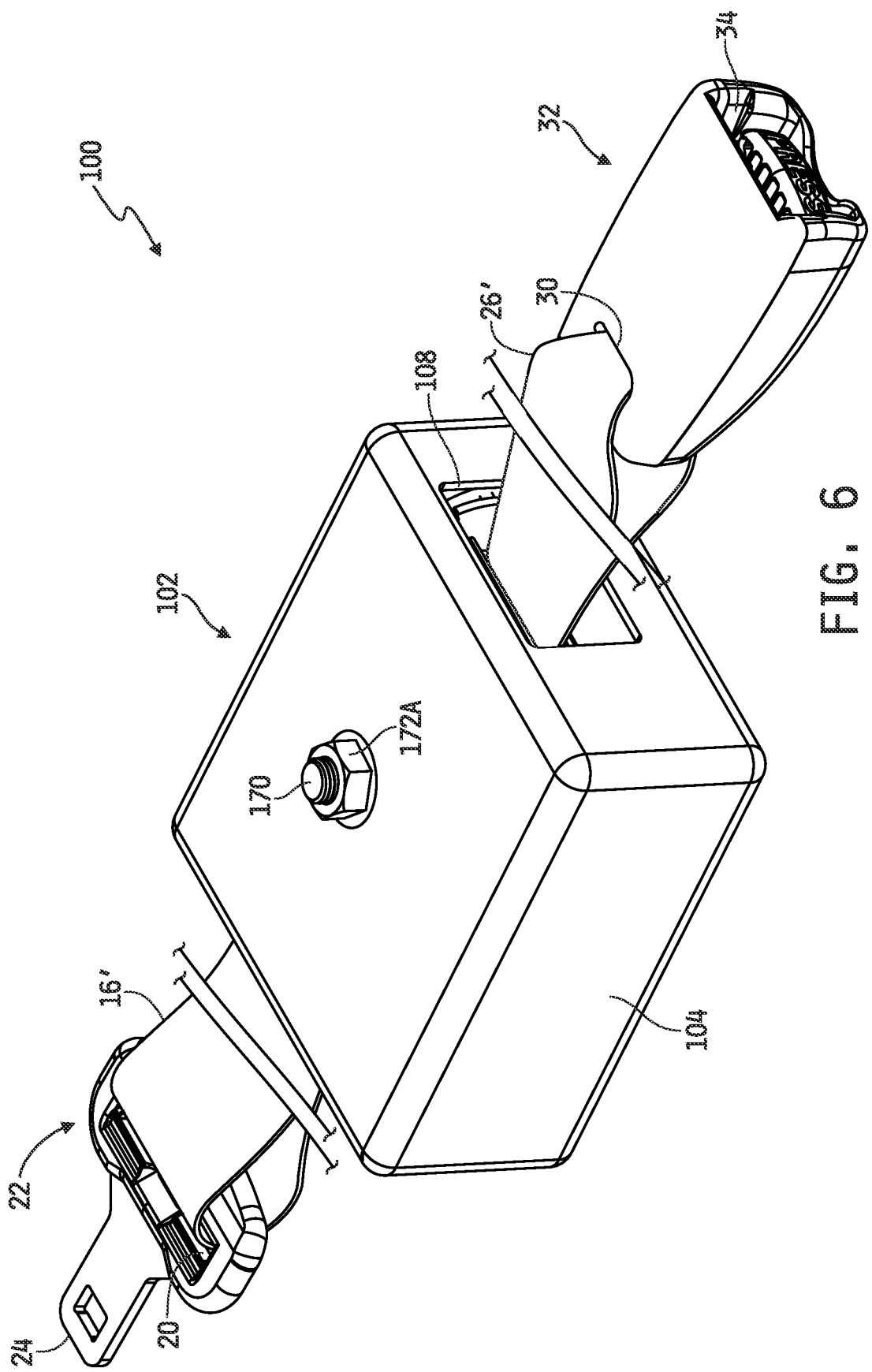
FIG. 6 is a perspective view of the dual-web retractor arrangement of FIG. 5.
Figure 7:
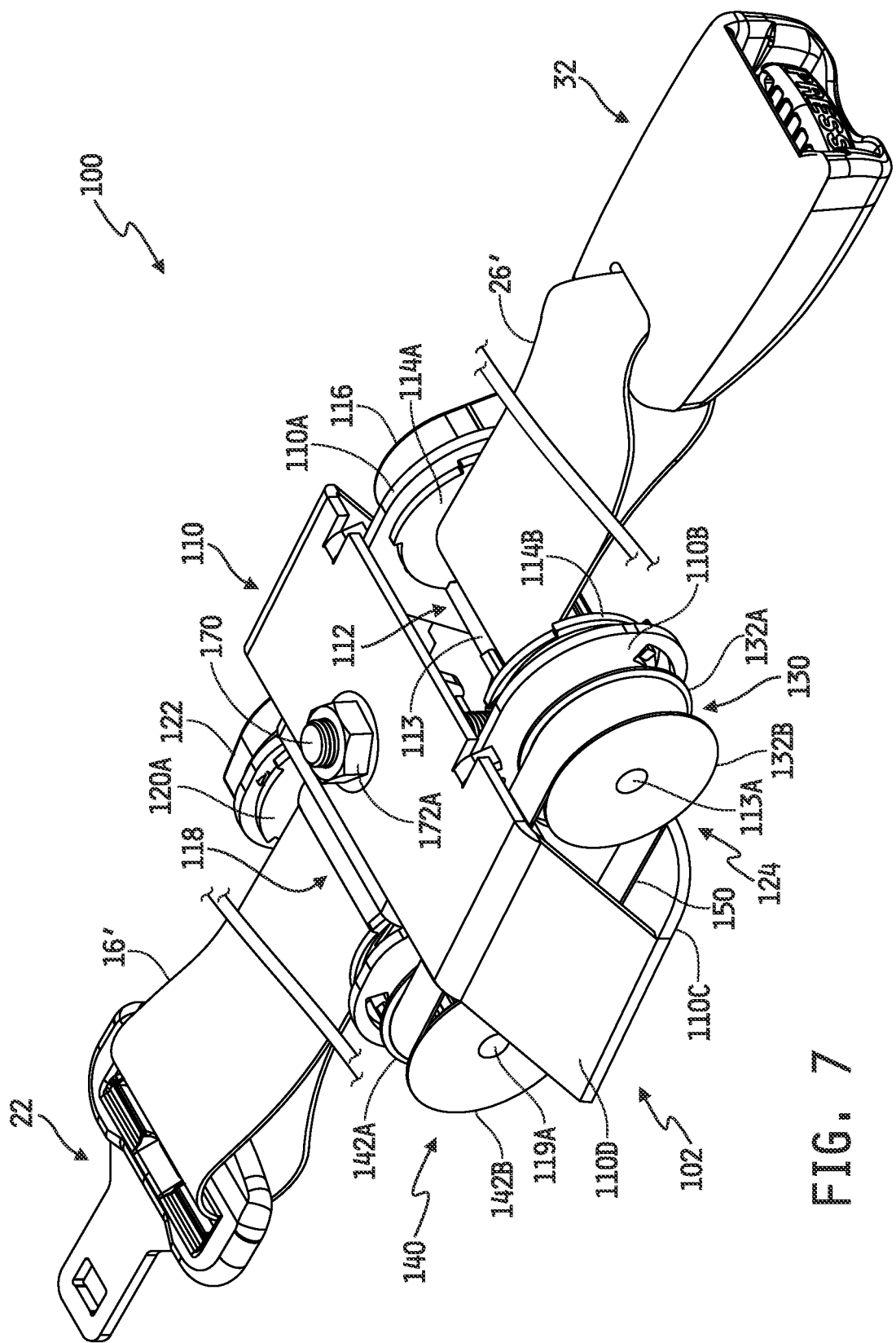
FIG. 7 is a perspective view of the dual-web retractor arrangement of FIG. 5 shown from the same perspective as FIG. 6 but shown with the cover removed.

As best illustrated in FIGS. 4A and 4B, the retractor 12 includes a frame 14 defining a pair of spaced-apart sidewalls (only sidewall 14A shown) each extending upwardly from a floor or bottom wall 14B of the frame 14. The frame 14 is shown supported by a support surface S, and the frame 14 is illustratively mountable, i.e., securable, to the support surface S in a conventional manner. In the illustrated embodiment, for example, the frame 14 is mounted to the support surface S by a fixation member 40, e.g., a bolt or screw, which extends through an opening formed through the frame wall 14B and into an opening in the support surface S. In embodiments in which the fixation member 40 is threaded, the fixation member 40 is illustratively advanced into the openings to secure the frame 14 to the support surface S. It will be understood that the fixation member 40 represents only one example structure and technique for mounting the frame 14 to the support surface S. Those skilled in the art will recognize other structures and/or techniques for mounting, i.e., securing, the frame 14 to the support surface S, and it will be understood that any such other structures and/or techniques are intended to fall within the scope of this disclosure.

A spool 44 is rotatably coupled to and between the two sidewalls of the frame 14 as best illustrated in FIGS. 4A, 4B. A conventional spring assembly (not shown) is coupled to an opposite side of the sidewall 14A, and the spring assembly illustratively biases the spool 44 to rotate in a web take-up direction as is conventional. The biasing force of such a spring assembly may be overcome by pulling the web 13 in a web pay-out direction, opposite the web take-up direction, to pay out, i.e., extract, web 13 from the retractor 12 in a conventional manner. In some embodiments, at least one toothed wheel is rotatably coupled to the spool 44 such that the toothed wheel rotates with the spool 44. In some such embodiments, two such toothed wheels are mounted to the spool 44; one at each end thereof. This embodiment is illustrated by example in FIGS. 4A and 4B with only one of the toothed wheels 48A shown. In such embodiments, the frame sidewalls illustratively define a locking bar opening therethrough, e.g., 14C, sized to engage a conventional rotatable locking bar 49. In such embodiments, the web retractor 12 is a conventional automatic locking retractor (ALR), wherein the locking bar 49 illustratively rotates within the opening 14C relative to the frame sidewall 14A to a position which cooperates, i.e., engages, with the teeth defined on the toothed wheels, e.g., 48A, to block rotation of the spool 44 in the web pay-out direction under deceleration conditions of the support surface S as is conventional and as illustrated in FIGS. 4A and 4B, and to otherwise rotate, or stay, in a position relative to the frame sidewall 14A, i.e., disengaged from the teeth defined on the toothed wheel(s), which allows rotation of the spool 44 in the web pay-out direction in response to a force applied to the web 13 in the pay-out direction that is greater than the biasing force of the spring assembly described above. In such embodiments, the spool 44 is rotatable relative to the frame 14 in the web take-up direction regardless of the position of the locking bar relative to the toothed wheel 48A, and the default position of the locking bar, i.e., under non-deceleration conditions and deceleration conditions below a threshold value, is that which allows the spool 44 to rotate in the web pay-out direction as just described. In some alternate embodiments, the retractor 12 may be configured as a conventional emergency locking retractor (ELR) or other conventional retractor.

In the illustrated embodiment, an attachment structure 46 is engageable with the spool 44 and with the web 13 to secure a portion 13A of the web 13 thereto. The web sections 16, 26 are defined by the web portion 13A such that the web section 16 extends in one direction away from the portion 13A and the web section 26 extends away from the portion 13A in an opposite direction. In one embodiment, the attachment structure 46 is provided in the form of a threaded fixation member, e.g., a screw or the like, configured to be advanced through the web portion 13A and into engagement with the spool 44 such that the web portion 13A is fixed to the spool 44. Those skilled in the art will recognize other structures and/or techniques for fixing the web portion 13A to the spool 44, and it will be understood that any such other structures and/or techniques are intended to fall within the scope of this disclosure.

In the embodiment illustrated in FIGS. 1-4B, the web sections alternatingly overlap one another as the web sections 16, 26 are wound together onto the spool 44 as the web sections 16, 26 are taken up as best illustrated in FIG. 4B and, in like manner, alternatingly unwind together from the spool 44 as the web sections 16, 26 are paid out from the retractor 12. In this embodiment, the web sections 16, 26 thus unwind from, and wind upon, the spool 44 approximately equally such that approximately equal lengths of the web sections 16, 26 pay out from, and are taken up by, the web retractor 12 with each rotation of the spool 44. In the illustrated embodiment, the web portion 13A is positioned approximately midway between the opposite ends of the web 13 such that the web sections 16, 26 are approximately equal in length as illustrated by example in FIG. 4A. In other embodiments, the web portion 13A may be positioned elsewhere along the web 13, e.g., offset from the midpoint of the web 13, such that the web section 16 is longer or shorter than the web section 26. In any case, the web retractor arrangement 10 is configured as just described to simultaneously take up and pay out the two web sections 16, 26 such that a conventional two-point web restraint (including the retractor 12, the web 13 and the engagement members 22, 32) is implemented with a single retractor 12.

Referring now to FIGS. 5-11, another embodiment 100 of a dual-web retractor arrangement is shown. In the illustrated embodiment, the retractor arrangement 100 includes a dual-web retractor 102 within which two separate webs 16', 26' are operatively attached to a frame 110 to which a housing 104 is mounted. One end of the housing 104 illustratively defines a web opening 106 through which the web 16' passes into and out of the housing 104, and an opposite end of the housing 104 defines another web opening 108 through which the web 26' passes into and out of the housing 104.

In the illustrated embodiment, one end of the web 16' is mounted to a spool of a retractor, as will be described in detail below, and an opposite end of the web 16' passes through a slot 20 defined on a conventional engagement member 22 after which it is attached back onto the web 16' in a conventional manner to secure the web 16' to the engagement member 22. In the illustrated embodiment, as described in the embodiment illustrated in FIGS. 1-4, the engagement member 22 is a conventional tongue member of a conventional restraint system, wherein the tongue member 22 illustratively defines a conventional tongue 24 configured to be detachably coupled to a conventional buckle member. One end of the web 26' is mounted to a spool of another retractor, as will also be described in detail below, and an opposite end of the web 26' passes through a slot 30 defined on another conventional engagement member 32 in the form of a conventional buckle member. The end of the web 26' is then attached back onto the web 26' in a conventional manner to secure the web 26' to the buckle member 32. The buckle member 32, as described above, illustratively defines a conventional slot 34 therein sized and configured to receive the tongue member 22. The buckle member 32 includes a conventional locking structure therein configured to lockingly engage the tongue member 22, and further includes a release actuator 35 operatively coupled to the locking structure. As further described above, the tongue member 22 and the buckle member 32 are configured and operable in a conventional manner such that advancing the tongue 24 into the slot 34 causes the locking structure to engage the tongue 24 and lock or lockingly couple the tongue member 22 to the buckle member 32, and the locking structure is responsive to actuation of the release actuator 35 to release the tongue 24 therefrom and, in some embodiments, to at least partially eject the tongue 24 from the slot 34. In the illustrated embodiment, the lengths of the webs 16', 26' are approximately equal, although in alternate embodiments the length of the web 16' may be less than or greater than the length of the web 26'.

Figure 8:
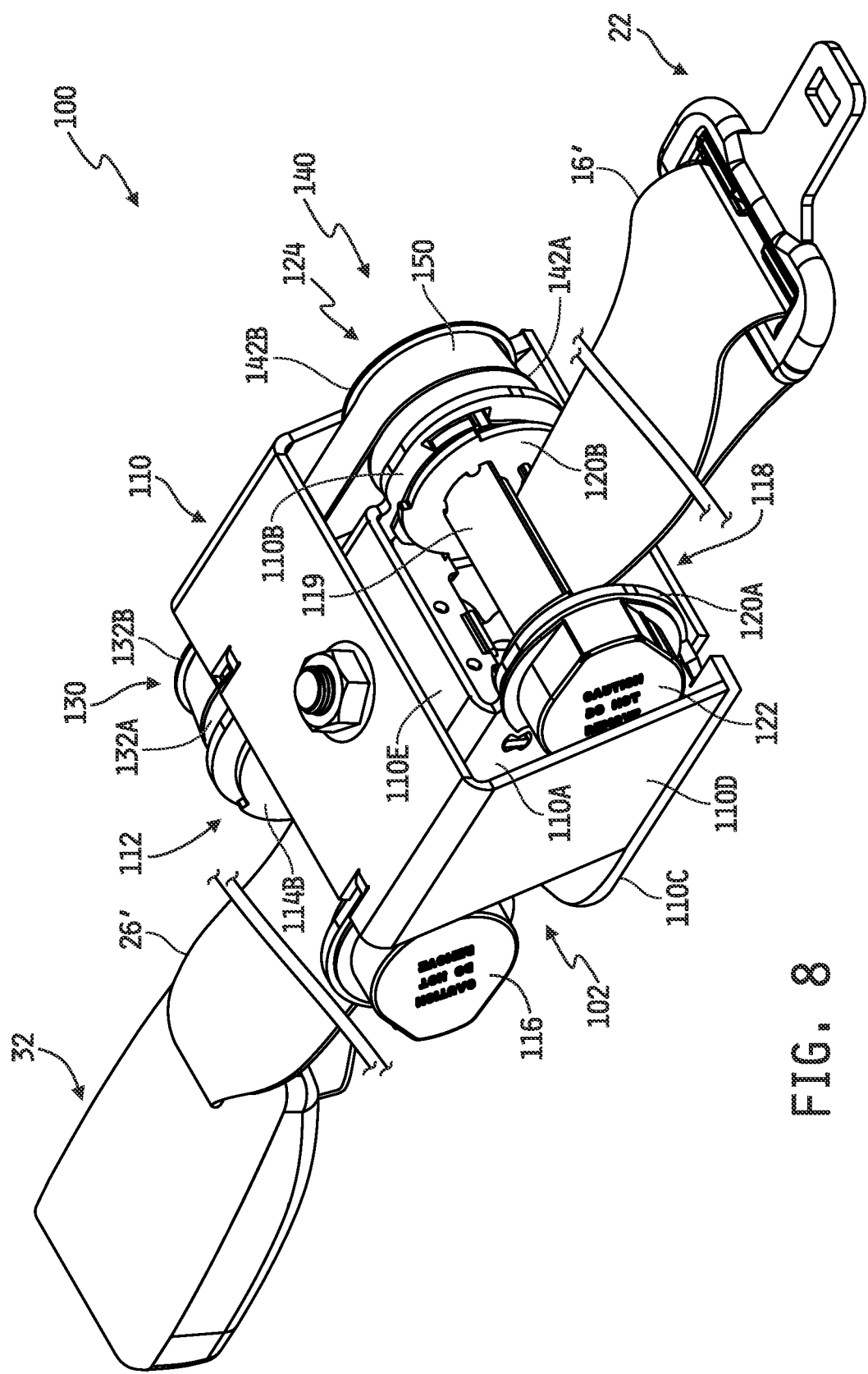
FIG. 8 is a perspective view of the dual-web retractor arrangement of FIGS. 1 and 7 shown from an opposite end of the retractor.
Figure 9:
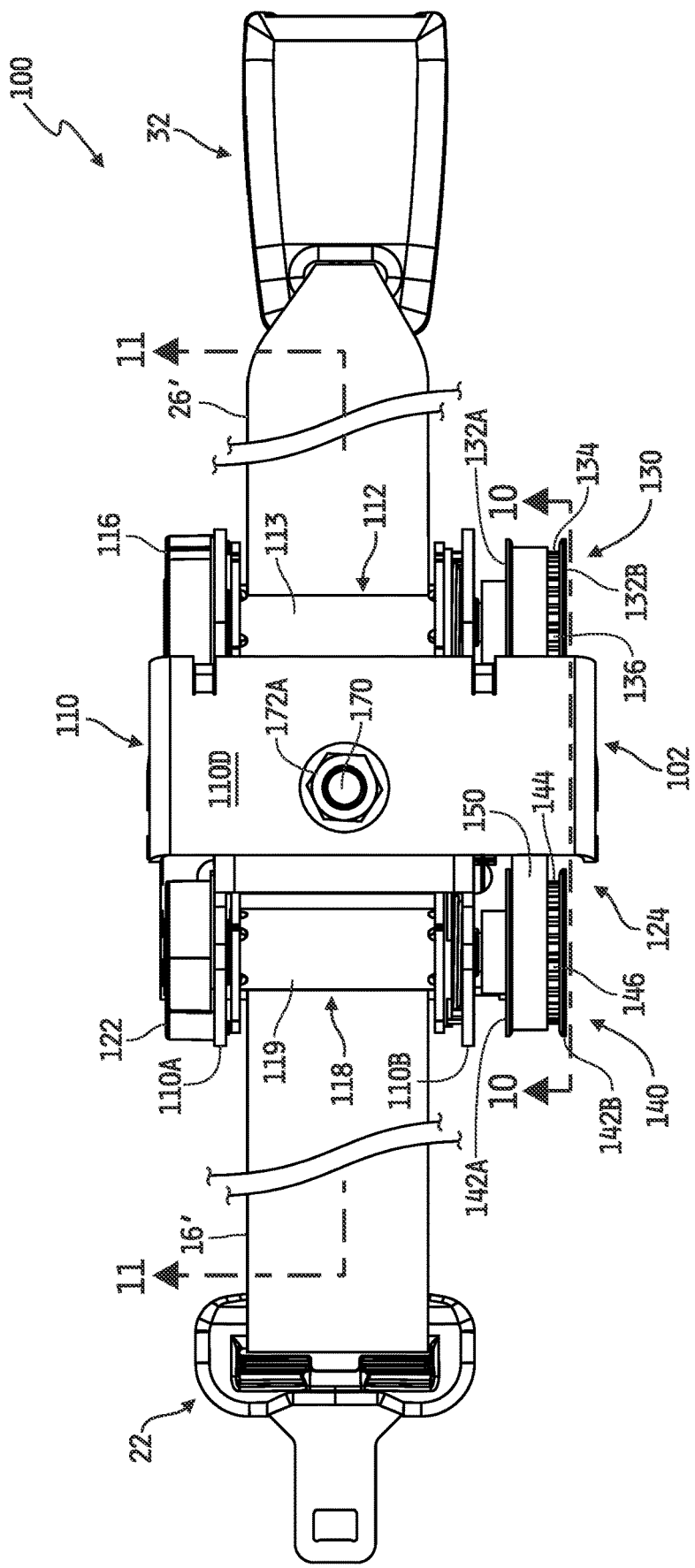
FIG. 9 is a top plan view of the dual-web retractor arrangement of FIGS. 5-8.
Figure 10:
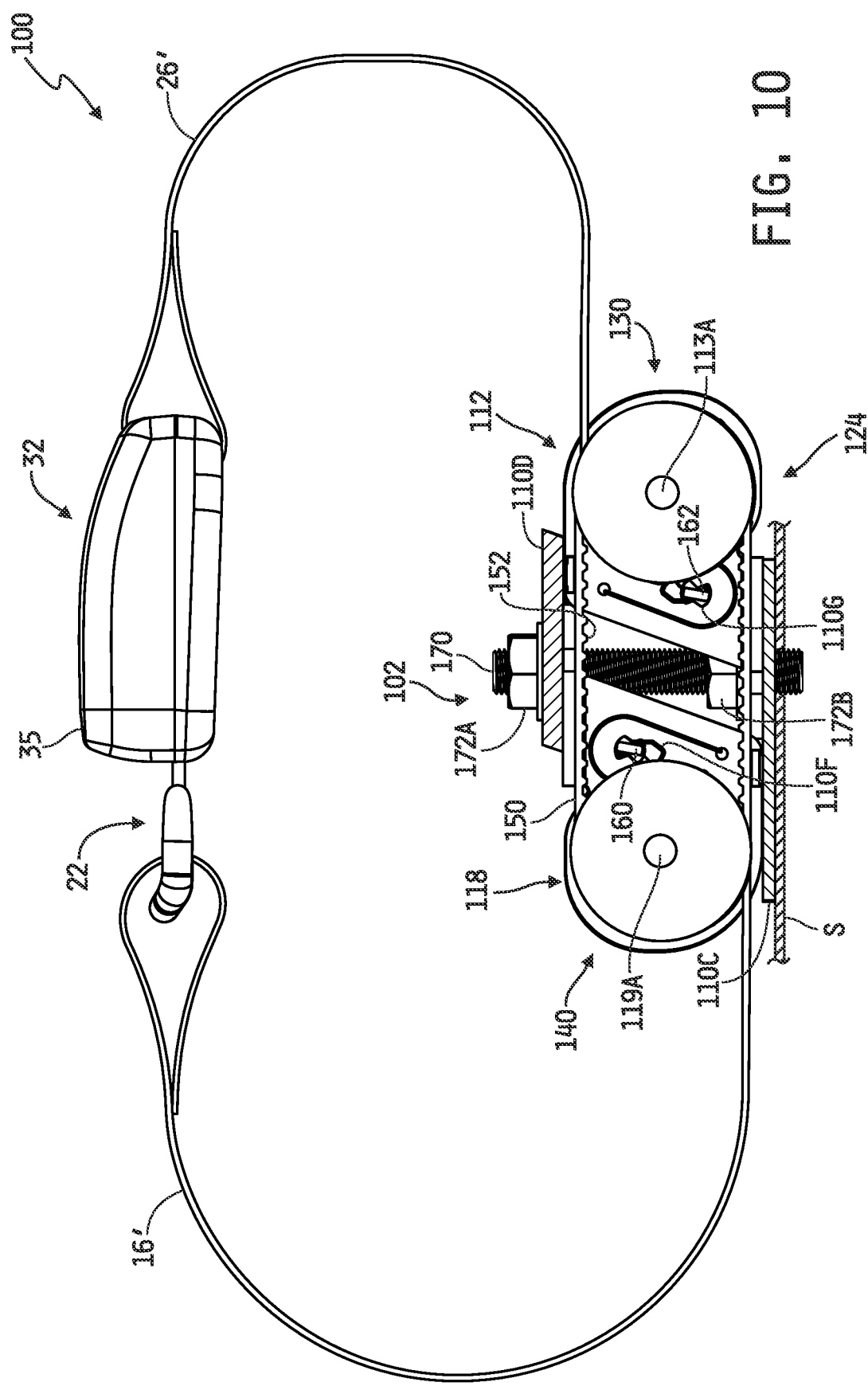
FIG. 10 is a cross-sectional view of the dual-web retractor arrangement of FIG. 9 as viewed along section lines 10-10.

As best illustrated in FIGS. 7-11, the retractor 102 includes a frame 110 defining a pair of spaced-apart sidewalls 110A, 110B each extending upwardly from a floor or bottom wall 110C of the frame 110. The frame 110 further illustratively includes a top plate 110E which extends over the bottom wall 110C and is illustratively mounted to the free (top) ends of the side walls 110A, 110B as best shown in FIGS. 8 and 9. As also depicted in FIGS. 7-11, some embodiments of the frame 110 illustratively include a bracket 110D having opposing side walls each extending downwardly into engagement with the bottom wall 110C of the frame 110, and having a top plate coupled to and between the bracket side walls such that the bracket 110D extends over the top plate 110E with bracket side walls mounted to the bottom wall 110C.

The frame 110 is shown supported by a support surface S (see, e.g., FIG. 10), and the frame 110 is illustratively mountable, i.e., securable, to the support surface S in a conventional manner. In the illustrated embodiment, for example, the frame 104 is mounted to the support surface S by a fixation member 170, e.g., a bolt or screw, which extends through an opening formed through the frame wall 110C and into an opening in the support surface S. In some embodiments, the fixation member 170 is a threaded bolt, and in such embodiments the fixation member 170 is affixed to the bracket 110D and to the bottom wall 110C via conventional threaded engagement members, e.g., nuts, 172A, 172B respectively. In embodiments in which the fixation member 170 is threaded, the fixation member 170 is illustratively advanced into the openings to secure the frame 110 to the support surface S. It will be understood that the fixation member 170 represents only one example structure and technique for mounting the frame 110 to the support surface S. Those skilled in the art will recognize other structures and/or techniques for mounting, i.e., securing, the frame 110 to the support surface S, and it will be understood that any such other structures and/or techniques are intended to fall within the scope of this disclosure.

The frame 110 illustratively supports two spaced-apart web retractors 112, 118 each separately integrated into the frame 110 at opposite ends thereof. The web retractor 112 illustratively includes a spool 113 rotatably coupled to and between the two sidewalls 110A, 110B of the frame 110 as best illustrated in FIGS. 7-11, and one end of the web 26' is affixed to the spool 113 in a conventional manner. A conventional spring assembly 116 is coupled to an opposite (i.e., outer) side of the sidewall 110A, and the spring assembly 116 illustratively biases the spool 113 to rotate in a web take-up direction as is conventional. The biasing force of the spring assembly 116 may be overcome by pulling the web 26' in a web pay-out direction, opposite the web take-up direction, to pay out, i.e., extract, web 26' from the retractor 112 in a conventional manner. In some embodiments, at least one toothed wheel is rotatably coupled to the spool 113 such that the toothed wheel rotates with the spool 113. In some such embodiments, two such toothed wheels are mounted to the spool 113; one at each end thereof. This embodiment is illustrated by example in FIGS. 7-11 in which a toothed wheel 114A is rotatably mounted to the spool 113 adjacent to the side wall 110A and another toothed wheel 114B is mounted to the spool adjacent to the side wall 114B, such that the wheels 114A, 114B are both in-board of the frame 110 between the inner surfaces of the side walls 110A, 110B. In such embodiments, the frame sidewalls 110A, 110B each illustratively define a locking bar opening therethrough (see, e.g., locking bar opening 110G defined through the side wall 110A in FIG. 11), sized to engage a conventional rotatable locking bar 162.

In such embodiments, the web retractor 112 is a conventional automatic locking retractor (ALR), wherein the locking bar 162 illustratively rotates relative to the frame sidewalls 110A, 110B to a position which cooperates with the teeth defined on the toothed wheels 114A, 114B to block rotation of the spool 113 in the web pay-out direction under deceleration conditions of the support surface S as is conventional, and to otherwise move, or stay, in a position relative to the frame sidewalls 110A, 110B which allows rotation of the spool 113 in the web pay-out direction in response to a force applied to the web 26' in the pay-out direction that is greater than the biasing force of the spring assembly 116 as described above. In such embodiments, the spool 113 is rotatable relative to the frame 110 in the web take-up direction regardless of the position of the locking bar 162 relative to the toothed wheels 114A, 114B, and the default position of the locking bar 162, i.e., under non-deceleration conditions and deceleration conditions below a threshold value, is that which allows the spool 113 to rotate in the web pay-out direction as just described. In some alternate embodiments, the retractor 112 may be configured as a conventional emergency locking retractor (ELR) or other conventional retractor.

In the illustrated embodiment, the web retractor 118 is identical to the web retractor 112 in that the web retractor 118 illustratively includes a spool 119 rotatably coupled to and between the two sidewalls 110A, 110B of the frame 110, and one end of the web 16' is affixed to the spool 119 in a conventional manner. In the illustrated embodiment, the sidewalls 110A, 110B are each single, unitary sidewalls to and between which both the spools 113 and 119 are rotatably mounted. In some alternative embodiments, the sidewalls 110A, 110B may be provided in the form of a first set of spaced-apart sidewalls between and to which the spool 113 is rotatably mounted, and a second set of spaced-apart sidewalls between and to which the spool 119 is rotatably mounted, wherein the first and second sets of sidewalls are spaced apart from one another and coupled together, e.g., via the base 110C of the frame and/or one or more coupling plates, strips, straps or other conventional coupling members. In any case, a conventional spring assembly 122 is coupled to an opposite (i.e., outer) side of the sidewall 110A such that the spring assembly 122 biases the spool 119 to rotate in a web take-up direction. The biasing force of the spring assembly 122 may be overcome by pulling the web 16' in a web pay-out direction, opposite the web take-up direction, to pay out, i.e., extract, web 16' from the retractor 118 in a conventional manner. As best shown in FIGS. 9 and 11, the spools 113, 119 are spaced apart and arranged such that the longitudinal axes about which the spools 113, 119 separately rotate are substantially parallel with one another.

In some embodiments, at least one toothed wheel is rotatably coupled to the spool 119 such that the toothed wheel rotates with the spool 119. In some such embodiments, two such toothed wheels are mounted to the spool 119; one at each end thereof. This embodiment is illustrated by example in FIGS. 7-11 in which a toothed wheel 120A is rotatably mounted to the spool 119 adjacent to the side wall 110A and another toothed wheel 120B is mounted to the spool adjacent to the side wall 114B, such that the wheels 120A, 120B are both in-board of the frame 110 between the inner surfaces of the side walls 110A, 110B. In such embodiments, the frame sidewalls 110A, 110B each illustratively define a locking bar opening therethrough (see, e.g., locking bar opening 110F defined through the side wall 110A in FIG. 11), sized to engage a conventional rotatable locking bar 160. In such embodiments, the web retractor 118 is a conventional automatic locking retractor (ALR), wherein the locking bar 160 illustratively rotates relative to the frame sidewalls 110A, 110B to a position which cooperates with the teeth defined on the toothed wheels 120A, 120B to block rotation of the spool 119 in the web pay-out direction under deceleration conditions of the support surface S as is conventional, and to otherwise move, or stay, in a position relative to the frame sidewalls 110A, 110B which allows rotation of the spool 119 in the web pay-out direction in response to a force applied to the web 16' in the pay-out direction that is greater than the biasing force of the spring assembly 122 as described above. In such embodiments, the spool 119 is rotatable relative to the frame 110 in the web take-up direction regardless of the position of the locking bar 160 relative to the toothed wheels 120A, 120B, and the default position of the locking bar 160, i.e., under non-deceleration conditions and deceleration conditions below a threshold value, is that which allows the spool 119 to rotate in the web pay-out direction as just described. In some alternate embodiments, the retractor 118 may be configured as a conventional emergency locking retractor (ELR) or other conventional retractor.

In the embodiment illustrated in FIGS. 5-11, the dual-web retractor arrangement 100 includes a retractor spool synchronization assembly 124 operatively coupled to each spool 113, 119 of a respective one of the retractors 112, 118. The spool synchronization assembly 124 is illustratively operable, as will be described in detail below, to synchronize rotation of the two spools 113, 119 such that they rotate together and at the same rate so that substantially equal amounts of the webs 16', 26' are taken up and paid out by the retractors 112, 118 as the spools 113, 119 rotate together. In some alternate embodiments, the spool synchronization assembly 124 may be configured to synchronize rotation of the spools 113, 119 such that they rotate together and at the different rates so that different amounts of the webs 16', 26' are taken up and paid out by the retractors 112, 118 as the spools 113, 119 rotate together.

As best illustrated in FIGS. 7-10, the spool synchronization assembly 124 is illustratively implemented in the form of a belt drive unit including a pair of pulley assemblies 130, 140 each operatively coupled to a respective one of the spools 113, 119 and a closed belt 150 engaging the pulley assemblies 130, 140 to synchronize rotation of the spools 113, 119. The pulley assembly 130 illustratively includes a pair of spaced apart wheels 132A, 1326 each coupled to a rotatable shaft 113A such that the wheels 132A, 1326 both rotate with the shaft 113A. In some embodiments, the shaft 113A is part of, e.g., an extension of, the spool 113, although in other embodiments the shaft 113A may be separate from yet operatively coupled to the spool 113. In any case, the shaft 113A is driven by, and thus rotates with, the spool 113 such that the wheels 132A, 132B of the pulley assembly 130 are likewise driven by, and thus rotate with, the spool 113. The pulley assembly 130 further illustratively defines a radial, e.g., cylindrical, belt engaging surface 134 between the wheels 132A, 132B. In the illustrated embodiment, the belt-engaging surface 134 defines alternating teeth and channels 136 thereon configured to engage complementary alternating teeth and channels 152 defined on an engagement surface of the belt 150. As the pulley assembly 130 is rotatably driven by the shaft 113, the belt engaging surface 134 of the pulley assembly 130 thus engages and moves the belt 150 radially about the pulley assembly 130 in a conventional manner.

In the illustrated embodiment, the pulley assembly 140 is identical to the pulley assembly 130 and includes a pair of spaced apart wheels 142A, 142B each coupled to a rotatable shaft 119A such that the wheels 142A, 142B both rotate with the shaft 119A. In some embodiments, the shaft 119A is part of, e.g., an extension of, the spool 119, although in other embodiments the shaft 119A may be separate from, yet operatively coupled to, the spool 119. In any case, the shaft 119A is driven by, and thus rotates with, the spool 119 such that the wheels 142A, 142B of the pulley assembly 140 are likewise driven by, and thus rotate with, the spool 119. The pulley assembly 140 further illustratively defines a radial, e.g., cylindrical, belt engaging surface 144 between the wheels 142A, 142B. In the illustrated embodiment, the belt-engaging surface 144 defines alternating teeth and channels 146 thereon configured to engage the complementary alternating teeth and channels 152 defined on an engagement surface of the belt 150. As the pulley assembly 140 is rotatably driven by the shaft 119, the belt engaging surface 144 of the pulley assembly 140 thus engages and moves the belt 150 radially about the pulley assembly 140 in a conventional manner. In an alternate embodiment, the pulley assemblies 130, 140 may each include only a single wheel operatively coupled to the respective spools 113, 119 such that the spool 113 rotatably drives the single wheel of the pulley assembly 130 and the spool 119 rotatably drives the single wheel of the pulley assembly 140. In this embodiment, the peripheries of the single wheels may be configured to engage the belt 150, and the belt 150, or chain or other drive mechanism, may thus be wrapped about the outer peripheries of the single wheels of each of the pulley assemblies 130, 140.

The belt drive unit 124 is illustratively configured such that, when driven by one of the pulley assemblies 130, 140 as just described, the belt 150 causes the other pulley assembly 130, 140 to rotate in the same direction. Thus, if the web 26' is drawn out of the retractor 112, i.e., such that the forced rotation of the spool 113 in the web payout direction pays out the web 26' from the retractor 112, such rotation of the spool 113 drives the pulley assembly 130 to rotate in the same web payout direction which, when transferred to the pulley assembly 140 via the belt 150, likewise causes the pulley assembly 140 to rotate in the web payout direction and thus drives the spool 119 of the retractor 118 the web payout direction. As a result, rotation of the spool 113 of the retractor 112 in the web payout direction, by manually drawing the web 26' from the retractor 112 with a force greater than the biasing force of the spring assembly 116, is transferred via the spool synchronization assembly 124 to the spool 119 of the retractor 118 to cause the spool 119 to likewise rotate in the web payout direction at the same rate or speed of rotation as the spool 113 such that the retractor 118 pays out the web 16' at the same rate, i.e., with the same length, as that of the web 26'. The same action just described occurs when the web 16' is drawn out of the retractor 118, i.e., rotation of the spool 119 is transferred via the spool synchronization assembly 124 to the spool 113 of the retractor 112 to cause the spool 113 to likewise rotate in the web payout direction at the same rate or speed of rotation as the spool 119 such that the retractor 112 pays out the web 26' at the same rate, i.e., with the same length, as that of the web 16'.

The reverse occurs if either web 16', 26' is retracted into a respective one of the retractors 118, 112. Thus, for example, rotation of the spool 113 of the retractor 112 in the web take up direction, i.e., under the bias of the spring assembly 122, is transferred via the spool synchronization assembly 124 to the spool 119 of the retractor 118 to cause the spool 119 to likewise rotate in the web take up direction at the same rate or speed of rotation as the spool 113 such that the retractor 118 takes up the web 16' onto the spool 119 at the same rate, i.e., with the same length, as that of the web 26'. This same action occurs when the web 16' is taken up on the spool 119 under bias of the spring assembly 116, i.e., rotation of the spool 119 is transferred via the spool synchronization assembly 124 to the spool 113 of the retractor 112 to cause the spool 113 to likewise rotate in the web take up direction at the same rate or speed of rotation as the spool 119 such that the retractor 112 takes up the web 26' onto the spool 113 at the same rate, i.e., with the same length, as that of the web 16'.

As described above, the spool synchronization assembly 124 is illustratively configured to cause the spools 113, 119 to rotate in the web pay out and web take up directions at the same rates or speeds such that substantially equal lengths of the webs 26', 16' are paid out of and taken up by the spools 113, 119. In some alternate embodiments, the spool synchronization assembly 124 may be configured, e.g., via selective radial sizing of the belt engaging surface 134 of the pulley assembly 130 and/or of the belt engaging surface 144 of the pulley assembly 140, to cause the spools 113, 119 to rotate at different rates or speeds such that different lengths of the webs 26', 16' are paid out of and taken up by the spools 113, 119. Those skilled in the art will recognize other conventional structures and/or techniques for implementing the spool synchronization assembly 124 to cause equal (or unequal) lengths of the webs 16', 26' to be paid out of and taken up by the respective retractors 112, 118, and it will be understood that any such other conventional structures and/or techniques are intended to fall within the scope of this disclosure.

Figure 12:
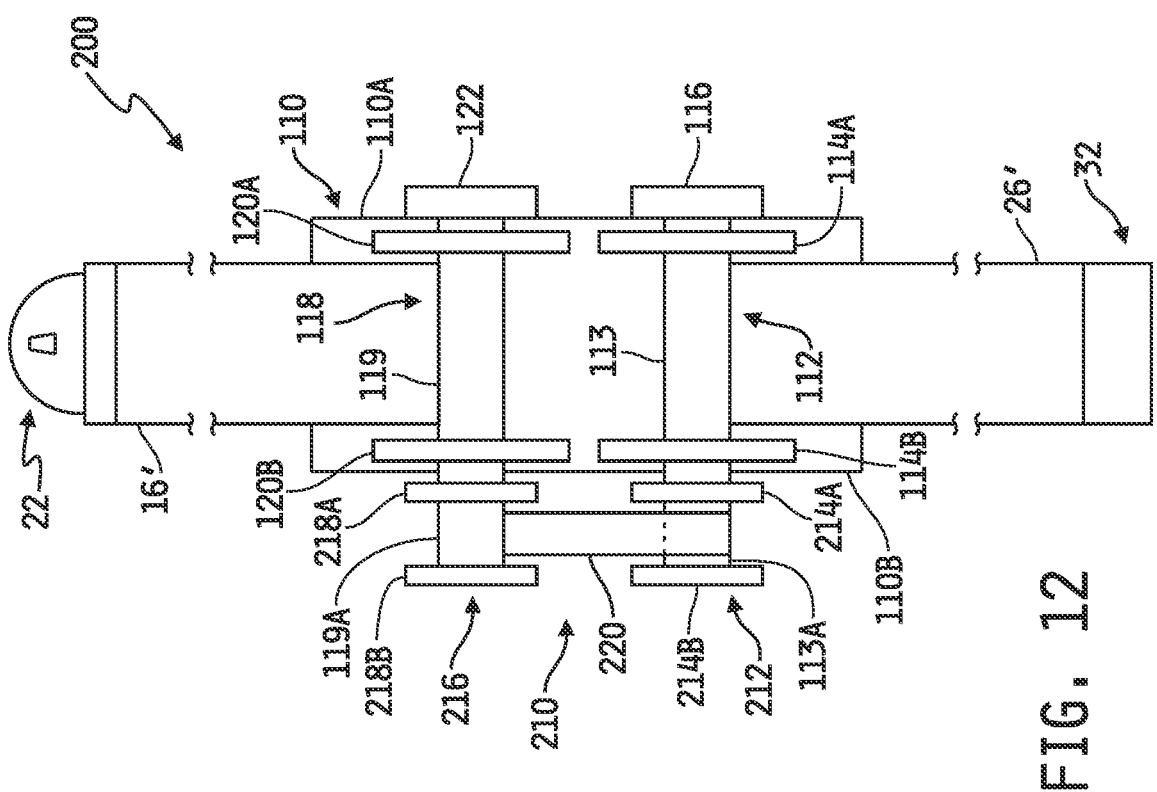
FIG. 12 is a top plan view of yet another embodiment of a dual-web retractor arrangement.

Referring now to FIG. 12, yet another embodiment 200 of a dual-web retractor arrangement is shown. The embodiment 200 illustrated in FIG. 12 shares many structures and features in common with the embodiment 100 illustrated in FIGS. 5-11. In this regard, like components are identified by like reference numbers, and descriptions of such components will not be repeated here for brevity. The dual-web retractor arrangement 200 illustratively differs from the dual-web retractor arrangement 100 illustrated in FIGS. 5-11 in the design and structure of the spool synchronization assembly 210. The spool synchronization assembly 210 is illustratively operable, as will be described in detail below, to synchronize rotation of the two spools 113, 119 such that they rotate together and at the same rate so that substantially equal amounts of the webs 16', 26' are taken up and paid out by the retractors 112, 118 as the spools 113, 119 rotate together. In some alternate embodiments, the spool synchronization assembly 210 may be configured to synchronize rotation of the spools 113, 119 such that they rotate together and at the different rates so that different amounts of the webs 16', 26' are taken up and paid out by the retractors 112, 118 as the spools 113, 119 rotate together.

In the illustrated embodiment, the spool synchronization assembly 210 is provided in the form of a web or tether drive unit including a pair of pulley assemblies 212, 216 each operatively coupled to a respective one of the spools 113, 119 and a flexible web or tether 220 engaging the pulley assemblies 212, 216 to synchronize rotation of the spools 113, 119. The pulley assembly 212 illustratively includes a pair of spaced apart wheels 214A, 214B each coupled to a rotatable shaft 113A such that the wheels 214A, 214B both rotate with the shaft 113A, and the pulley assembly 216 likewise includes a pair of spaced apart wheels 218A, 218B each coupled to a rotatable shaft 119A such that the wheels 218A, 218B both rotate with the shaft 119A. In some embodiments, the shaft 113A is part of, e.g., an extension of, the spool 113 and the shaft 119A is part of, e.g., an extension of, the spool 119, although in other embodiments the shaft 113A may be separate from yet operatively coupled to the spool 113 and/or the shaft 119A may be separate from yet operatively coupled to the spool 119. In any case, the shaft 113A is driven by, and thus rotates with, the spool 113 such that the wheels 214A, 214B of the pulley assembly 212 are likewise driven by, and thus rotate with, the spool 113, and the shaft 119A is driven by, and thus rotates with, the spool 119 such that the wheels 218A, 218B of the pulley assembly 216 are likewise driven by, and thus rotate with, the spool 119.

The web or tether 220 is affixed at one end to a portion of the shaft 113A between the wheels 214A, 214B of the pulley assembly 212 and is affixed at an opposite end to a portion of the shaft 119A between the wheels 218A, 218B of the pulley assembly 216. The length of the web or tether 220 is selected such that, as the pulley assembly 212 is rotatably driven by the shaft 113, the web or tether 220 wraps around, or is unwrapped from, the shaft 113A, thereby causing the shaft 119A to likewise rotate in the same (or an opposite) direction. Likewise, as the pulley assembly 216 is rotatably driven by the shaft 119, the web or tether 220 wraps around, or is unwrapped from, the shaft 119A, thereby causing shaft 113A to likewise rotate in the same (or an opposite) direction. Otherwise, the operation of the web or tether drive unit 210 is operable as described with respect to the embodiment 100 illustrated in FIGS. 5-11 in that wrapping and unwrapping of the web or tether 220 about and from the pulley assemblies 212, 216 causes the webs 26', 16' to be simultaneously taken up by and paid out from the retractors 112, 118 at the same or different rate. In an alternate embodiment, the pulley assemblies 212, 216 may each include only a single wheel operatively coupled to the respective spools 113, 119 such that the spool 113 rotatably drives the single wheel of the pulley assembly 212 and the spool 119 rotatably drives the single wheel of the pulley assembly 216. In this embodiment, the web or tether 220 is attached at each end to the outer periphery of a respective one of the single wheels of the pulley assemblies 212, 216, and the web or tether 220 may thus be wrapped about the outer peripheries of the single wheels of each of the pulley assemblies 212, 216.

Figure 13:
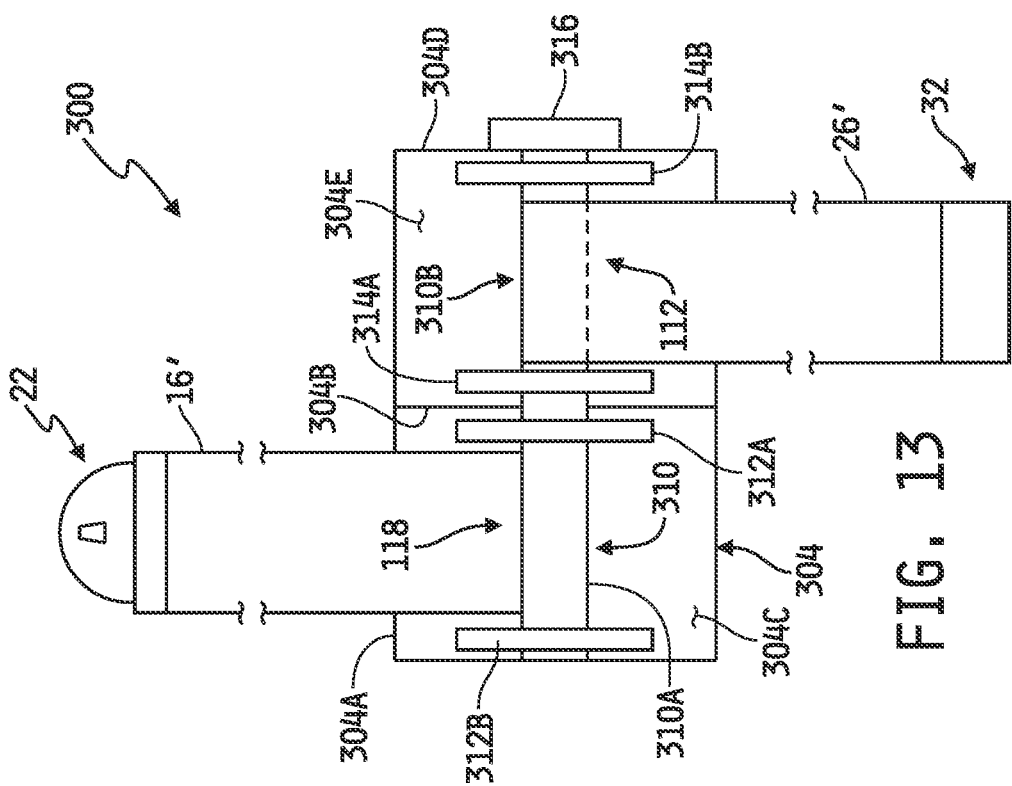
FIG. 13 is a top plan view of still another embodiment of a dual-web retractor arrangement.

Referring now to FIG. 13, still another embodiment 300 of a dual-web retractor arrangement is shown. The embodiment 300 illustrated in FIG. 13 shares some of the structures and features in common with the embodiments 100 and 200 illustrated in FIGS. 5-12. In this regard, like components are identified by like reference numbers, and descriptions of such components will not be repeated here for brevity. The dual-web retractor arrangement 300 illustratively differs from the dual-web retractor arrangements 100 and 200 illustrated in FIGS. 5-12 in that the retractors 112, 118 are positioned side-by-side and share a common spool 310 with one section 310A of the spool 310 defining the spool of the retractor 118 and with another section 310B of the spool 310 defining the spool of the retractor 112. The webs 16', 26' are illustratively affixed to the respective spool sections 310A, 310B in a manner which causes the webs 26', 16' to be simultaneously taken up by and paid out from the retractors 112, 118 at the same or different rate.

In the illustrated embodiment, the dual-web retractor arrangement 300 includes a frame 304 having spaced-apart sidewalls 304A, 304B extending upwardly from a bottom wall 304C of the frame 304, and another sidewall 304D spaced apart from the sidewall 304B with each extending upwardly from another bottom wall 304E contiguous or coupled to the bottom wall 304C such that the bottom walls 304C, 304E lie in the same plane. The spool 310 extends through, and is rotatably coupled to, each of the sidewalls 304A, 304B, 304D such that the spool section 310A is defined and extends between the sidewalls 304A, 304B and the spool section 310B is defined and extends between the sidewalls 304B, 304D. The spool sections 310A, 310B share a common longitudinal axis about which the spool 310 rotates relative to the frame 304.

In the illustrated embodiment, the retractor 118 includes toothed wheels 312A, 312B each rotatably coupled to the spool section 310A, and toothed wheels 314A, 314B each rotatably coupled to the spool section 310B. The toothed wheels 312A, 312B and 314A, 314B illustratively serve the same functions as the toothed wheels 48A, 114A, 114B and 120A, 120B illustrated in the attached figures and described above, and in this regard the retractors 112, 118 may be ALRs, ELRs or other retractor types. A spring assembly 316 is mounted to the sidewall 304D and is operatively coupled to the spool 310 in a manner which biases the spool 310, and thus both spool sections 310A, 310B, to rotate in the web take up direction. The spring assembly 316 may be identical to the spring assemblies 116, 122.

In the illustrated embodiment, the web 16' is affixed to the spool section 310A such that the web 16' pays out from, and is taken up from the underside of the spool section 310A, and the web 26' is affixed to the spool section 3106 such that the web 26' pays out from, and is taken up from the top side of the spool section 3106. Thus, rotation of the spool 310 in the web take up direction causes both of the webs 16', 26' to be simultaneously taken up on the respective spool sections 310A, 3106 at the same or different rate, and rotation of the spool 310 in the web pay out direction causes both of the webs 16', 26' to be simultaneously paid out from the respective spool sections 310A, 310B.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A dual-web retractor, comprising:
   a frame having first, second and third sidewalls spaced apart from one another with the second sidewall positioned between the first and third sidewalls,
   a spool rotatably mounted to and between the first, second and third sidewalls, the spool having a first spool section defined between the first and second sidewalls and a second spool section defined between the second and third sidewalls,
   a first web having one end coupled to the first spool section, and
   a second web having one end coupled to the second spool section,
   wherein rotation of the spool in a first direction causes the first and second webs to be simultaneously taken up on the first and second spool sections respectively,
   and wherein rotation of the spool in a second direction opposite the first direction causes the first and second webs to be simultaneously paid out from the first and second spool sections respectively.

2. The dual-web retractor of claim 1, further comprising a pair of engagement members configured to be releasably engaged to one another,
   wherein an opposite end of the first web is coupled to one of the pair of engagement members,
   and wherein an opposite end of the second web is coupled to the other of the pair of engagement members.

3. The dual-web retractor of claim 2, wherein the first web is coupled to the first spool section such that the first web is payable off the spool from one end of the frame,
   and wherein the second web is coupled to the second spool section such that the second web is payable off the spool from an opposite end of the frame.

4. The dual-web retractor of claim 1, further comprising a spring assembly coupled to one of the first and third sidewalls and to the spool, the spring assembly configured to apply a first force to the spool to cause the spool to rotate in the web take up direction to simultaneously take up the first and second webs on the first and second respective spool sections.

5. The dual-web retractor of claim 4, wherein the spool is responsive to a second force, greater than the first force, manually applied to the first or the second web in a direction away from the spool to cause the spool to rotate in the web payout direction to simultaneously pay out the first and second webs from the first and second respective spool sections.

6. The dual-web retractor of claim 1, wherein the dual-web retractor comprises an automatic locking retractor.

7. The dual-web retractor of claim 1, wherein the dual-web retractor comprises an emergency locking retractor.

8. The dual-web retractor of claim 1, further comprising:
   at least one toothed wheel rotatably coupled to the spool, and
   a locking bar operatively mounted to the frame, the locking bar movable relative to the frame under deceleration conditions of the frame to engage the at least one toothed wheel to block rotation of the spool in the web payout direction.

9. A dual-web retractor, comprising:
   a frame having first, second and third sidewalls spaced apart from one another with the second sidewall positioned between the first and third sidewalls,
   a spool rotatably mounted to and between the first, second and third sidewalls, the spool having a first spool section defined between the first and second sidewalls and a second spool section defined between the second and third sidewalls,
   a first web having one end coupled to the first spool section,
   a second web having one end coupled to the second spool section, and
   a spring assembly coupled to one of the first and third sidewalls and to the spool, the spring assembly configured to apply a first force to the spool to cause the spool to rotate in a web take up direction to simultaneously take up the first and second webs on the first and second respective spool sections.

10. The dual-web retractor of claim 9, wherein the spool is responsive to a second force, greater than the first force, manually applied to the first or the second web in a direction away from the spool to cause the spool to rotate in a web payout direction, opposite the web take up direction, to simultaneously pay out the first and second webs from the first and second respective spool sections.

11. The dual-web retractor of claim 10, wherein the first web is coupled to the first spool section such that the first web is payable off the spool from one end of the frame,
   and wherein the second web is coupled to the second spool section such that the second web is payable off the spool from an opposite end of the frame.

12. The dual-web retractor of claim 11, further comprising a pair of engagement members configured to be releasably engaged to one another,
   wherein an opposite end of the first web is coupled to one of the pair of engagement members,
   and wherein an opposite end of the second web is coupled to the other of the pair of engagement members.

13. The dual-web retractor of claim 9, wherein the dual-web retractor comprises an automatic locking retractor.

14. The dual-web retractor of claim 9, wherein the dual-web retractor comprises an emergency locking retractor.

15. The dual-web retractor of claim 9, further comprising:
at least one toothed wheel rotatably coupled to the spool, and
a locking bar operatively mounted to the frame, the locking bar movable relative to the frame under deceleration conditions of the frame to engage the at least one toothed wheel to block rotation of the spool in the web payout direction.

16. A dual-web retractor, comprising:
a frame having first, second and third sidewalls spaced apart from one another with the second sidewall positioned between the first and third sidewalls,
a spool rotatably mounted to and between the first, second and third sidewalls, the spool having a first spool section defined between the first and second sidewalls and configured to couple to a first web, and a second spool section defined between the second and third sidewalls and configured to couple to a second web, and
a spring assembly coupled to one of the first and third sidewalls and to the spool, the spring assembly configured to apply a biasing force to the spool to cause the first and second spool sections to rotate in a first direction.

17. The dual-web retractor of claim 16, further comprising:
at least one toothed wheel rotatably coupled to the spool, and
a locking bar operatively mounted to the frame, the locking bar movable relative to the frame under deceleration conditions of the frame to engage the at least one toothed wheel to block rotation of the spool in a second direction opposite the first direction.

18. The dual-web retractor of claim 16, further comprising:
the first web, the first web coupled to the first spool section and configured to wrap about the first spool section upon rotation of the spool in the first direction, and
the second web, the second web coupled to the second spool section and configured to wrap about the second spool section upon rotation of the spool in the first direction.

19. The dual-web retractor of claim 18, wherein the first web is coupled to the first spool section such that the first web is payable off the spool from one end of the frame,
and wherein the second web is coupled to the second spool section such that the second web is payable off the spool from an opposite end of the frame.

20. The dual-web retractor of claim 16, wherein the dual-web retractor comprises an automatic locking retractor or an emergency locking retractor.

* * * * *